United States Patent
Fujiwara et al.

(10) Patent No.: US 6,661,618 B2
(45) Date of Patent: Dec. 9, 2003

(54) SUSPENSION FOR DISC DRIVE WITH INSULATING COVER FILM ON PIEZOELECTRIC ELEMENT

(75) Inventors: Tetsuya Fujiwara, Yokohama (JP); Kenichi Takikawa, Aiko-gun (JP)

(73) Assignee: NHK Spring Co., Ltd., Yokohama (JP)

( * ) Notice: Subject to any disclaimer, the term of this patent is extended or adjusted under 35 U.S.C. 154(b) by 248 days.

(21) Appl. No.: 09/813,582

(22) Filed: Mar. 21, 2001

(65) Prior Publication Data

US 2002/0080532 A1 Jun. 27, 2002

(30) Foreign Application Priority Data

Dec. 27, 2000 (JP) .......................................... 2000-398643

(51) Int. Cl.$^7$ .............................. G11B 21/24; G11B 5/56
(52) U.S. Cl. .................................. 360/294.4; 360/294.6
(58) Field of Search ........................... 360/294.4, 294.6, 360/294.3, 294.1, 294, 290, 240, 244.2

(56) References Cited

U.S. PATENT DOCUMENTS

| 4,991,045 A | | 2/1991 | Oberg ...................... 360/244.3 |
| 6,108,175 A | * | 8/2000 | Hawwa et al. ............ 360/294.4 |
| 6,222,706 B1 | * | 4/2001 | Stefansky et al. ........ 360/294.5 |
| 6,487,055 B1 | * | 11/2002 | Mei ......................... 360/294.4 |

FOREIGN PATENT DOCUMENTS

| JP | 60-127578 | | 7/1985 |
| WO | WO 98/27547 | * | 6/1998 |

OTHER PUBLICATIONS

M. Hanya et al, "Suspension Design for Windage and High Bandwidth", (Treatise), Presented on Mar. 27, 2000, Japan.

* cited by examiner

Primary Examiner—Julie Anne Watko
(74) Attorney, Agent, or Firm—Frishauf, Holtz, Goodman & Chick, P.C.

(57) ABSTRACT

A suspension comprises a load beam fitted with a flexure, an actuator base including a base plate, a hinge member thinner than the base plate, and a pair of piezoelectric ceramic elements. The piezoelectric ceramic elements displace the distal end portion of the load beam in a sway direction when supplied with voltage. Each piezoelectric ceramic element is stored in an opening portion in the actuator base. An electrical insulating cover film is pasted on each piezoelectric ceramic element. The cover film covers the opposite side faces of each piezoelectric ceramic element. The opposite end faces of each piezoelectric ceramic element are covered with an adhesive agent that fixes the element to the actuator base.

16 Claims, 5 Drawing Sheets

SUSPENSION FOR DISC DRIVE WITH INSULATING COVER FILM ON PIEZOELECTRIC ELEMENT

CROSS-REFERENCE TO RELATED APPLICATIONS

This application is based upon and claims the benefit of priority from the prior Japanese Patent Application No. 2000-398643, filed Dec. 27, 2000, the entire contents of which are incorporated herein by reference.

BACKGROUND OF THE INVENTION

The present invention relates to a suspension for disc drive incorporated in an information processing apparatus, such as a personal computer.

In a disc drive that is provided with a rotating magnetic disc or magneto-optical disc, a magnetic head is used to record on or read data from a recording surface of the disc. The magnetic head includes a slider opposed to the recording surface of the disc, a transducer stored in slider, etc. When the disc rotates at high speed, the slider slightly lifts off the disc, whereupon an air bearing is formed between the disc and the slider. A suspension for holding the magnetic head comprises a beam member called a load beam, a flexure formed of a very thin plate spring fixed to the load beam, a base plate provided on the proximal portion of the load beam, etc. The slider that constitutes the magnetic head is mounted on the distal end portion of the flexure.

In a hard disc drive (HDD), the track center of the disc must be subjected to following control within ±10% of the track width. With the recent development of higher-density discs, the track width has been being reduced to 1 μm or less, and it is hard to keep the slider in the track center. It is necessary, therefore, to carry out accurate position control of the slider as well as to increase the stiffness of the disc, thereby reducing the oscillation of the disc.

In general, conventional disc drives are of a single-actuator type such that a suspension is moved by means of a voice coil motor only. The single-actuator suspension has many peaks of resonance in low-frequency bands. Thus, it is hard to control a slider (head portion) on the distal end of the suspension in high-frequency bands by means of the voice coil motor only, and the bandwidth of a servo cannot be enhanced.

Accordingly, a dual-actuator suspension has been developed including a micro-actuator portion as well as a voice coil motor. The micro-actuator portion causes a second actuator slightly to move the distal end portion of a load beam or a slider in the transverse direction of the suspension (so-called sway direction).

Since the movable portion that is driven by means of the second actuator is considerably lighter in weight than a movable portion of the single-actuator suspension, the slider can be controlled in high-frequency bands. Thus, the dual-actuator suspension, compared with the single-actuator suspension, can make the bandwidth of a servo for the position control of the slider several times higher, and track misses can be reduced correspondingly.

It is known that a piezoelectric ceramic element, such as lead zirconate-titanate (solid solution of $PbZrO_3$ and $PbTiO_3$) called PZT, can be suitably used as the material of the second actuator. Since PZT has a considerably high resonance frequency, it is suited for the second actuator that is used in the dual-actuator suspension.

Piezoelectric ceramic elements such as PZT are fragile and breakable, and besides, contamination that is attributable to the generation of particles from the element surface constitutes a hindrance to practical use. If these particles get into the space between the slider and the disc that is rotating at high speed, the disc and the slider are damaged, so that data recorded on the disc may be broken or a crush may be caused.

The inventors hereof conducted a test for examining the way of generation of particles from a suspension that uses piezoelectric ceramic elements. In this test, the suspension was washed in a liquid by means of an ultrasonic cleaner, and particles not smaller than a given size in a given quantity of liquid were counted. In consequence, it was found that the suspension that uses the piezoelectric ceramic elements produce more particles than a conventional suspension that uses no piezoelectric ceramic elements does.

In the piezoelectric ceramic elements, metal layers for electrodes are formed individually on the obverse and reverse sides by sputtering or plating. Accordingly, there is hardly any possibility of particles being generated from the obverse or reverse side of the element. Since the side or end faces of each piezoelectric ceramic element are cut by means of a dicing machine or the like in a manufacturing process, they are exposed cut surfaces. These cut surfaces form sources of particles, so that particles continue to be generated every time the suspension is cleaned.

BRIEF SUMMARY OF THE INVENTION

Accordingly, the object of the present invention is to provide a suspension for disc drive with a micro-actuator portion capable of restraining generation of particles.

In order to achieve the above object, a suspension of the present invention comprises a load beam provided with a flexure, an actuator base provided on the proximal portion of the load beam, a piezoelectric ceramic element mounted on the actuator base and adapted to be distorted to displace the load beam when voltage is applied thereto, and a cover film formed of an electrical insulating material and attached to at least the side faces of the piezoelectric ceramic element, thereby covering the side faces. According to this invention, the cover film that covers at least the side faces of the piezoelectric ceramic element can prevent generation of particles from the element. Since the cover film cannot substantially hinder the displacement of the piezoelectric ceramic element, it never causes the stroke of the element to deteriorate.

Preferably, in the suspension of the present invention, the actuator base is formed having an opening portion capable of holding the piezoelectric ceramic element, the opening portion holding the ceramic element with the cover film thereon. According to this invention, the piezoelectric ceramic element can be protected as it is held in the opening portion of the actuator base, and the displacement of the element can be transmitted more effectively to the load beam.

In the suspension of the invention, moreover, the load beam and the actuator base may be connected to each other by means of an independent flexible hinge member. According to this invention, materials that meet required properties of the load beam, actuator base, and hinge member can be used, so that the properties of the suspension can be improved.

The cover film may be formed of a plastic tape with an adhesive agent thereon. According to this invention, the cover film with a desired thickness can be easily attached to the piezoelectric ceramic element. The adhesive agent described herein is a concept that includes an agent that can be cured by means of light, such as ultraviolet rays, or a self-adhesive, as well as an adhesive agent that is cured after it is spread in a liquid state.

The cover film may include portions covering the opposite side faces of the piezoelectric ceramic element, a portion extending between the opposite side faces, and a slit or hole for exposing a bonding region between an electrode of the piezoelectric ceramic element and an external conductive member. According to this invention, the cover film formed of a resin tape or the like can be easily attached to the piezoelectric ceramic element, and the external conductive member can be bonded to the electrode of the piezoelectric ceramic element.

In the present invention, furthermore, the piezoelectric ceramic element may be bonded to the actuator base with the opposite end faces of the piezoelectric ceramic element covered with an electrical insulating adhesive agent. According to this invention, the cover film can prevent generation of particles from the opposite side faces of the piezoelectric ceramic element, and the adhesive agent can prevent generation of particles from the opposite end faces of the ceramic element.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A suspension 10 for disc drive according to a first embodiment of the present invention will now be described with reference to FIGS. 1 to 6.

Figure 1:
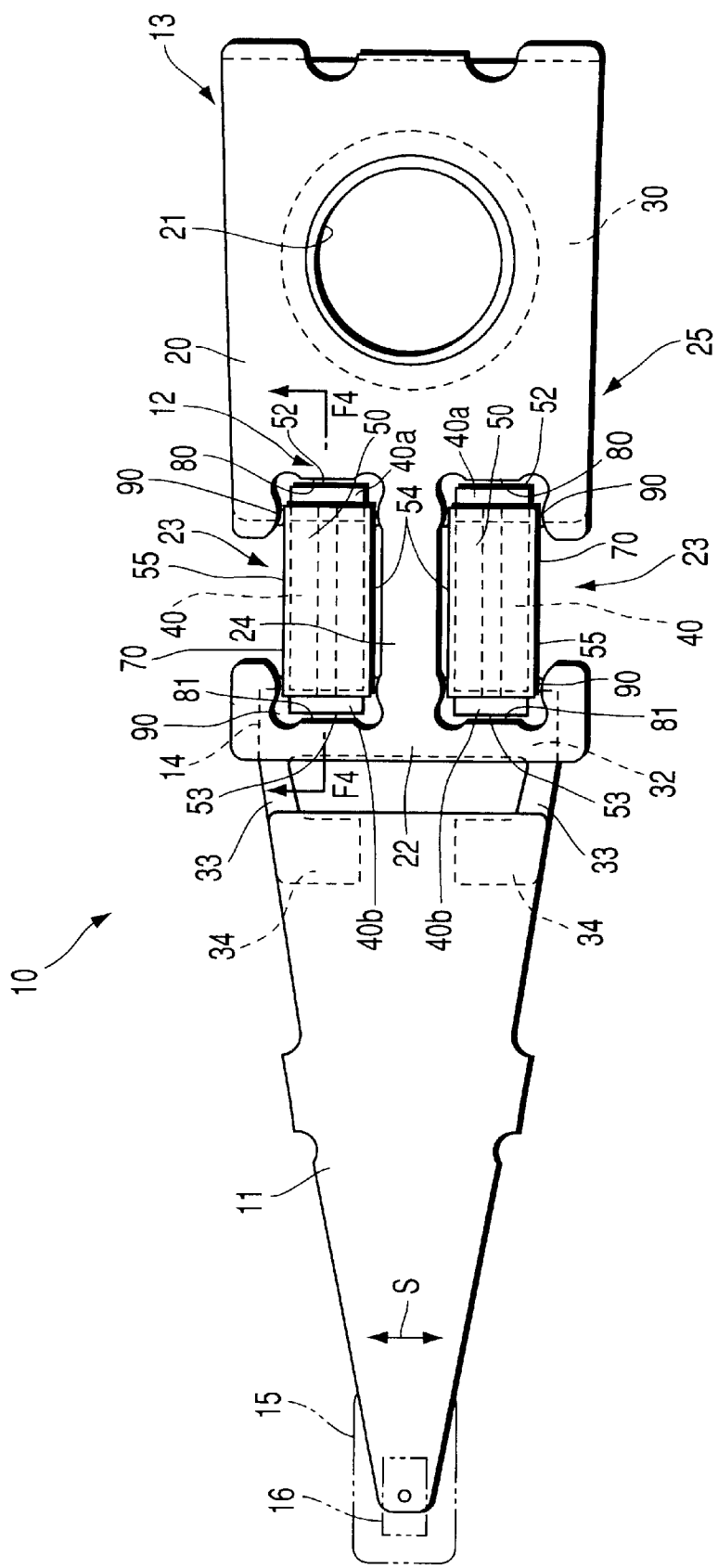
FIG. 1 is a plan view of a suspension according to a first embodiment of the present invention.

The suspension 10 of a dual-actuator type shown in FIG. 1 comprises a load beam 11, micro-actuator portion 12, base plate 13, hinge member 14, etc. The load beam 11 is formed of a springy metal plate with a thickness of, e.g., about 100 $\mu$m. A flexure 15 is mounted on the load beam 11. The flexure 15 is formed of a thin, metal precision plate spring that is thinner than the load beam 11. A slider that constitutes a magnetic head is provided on the distal end portion of the flexure 15.

Figure 2:
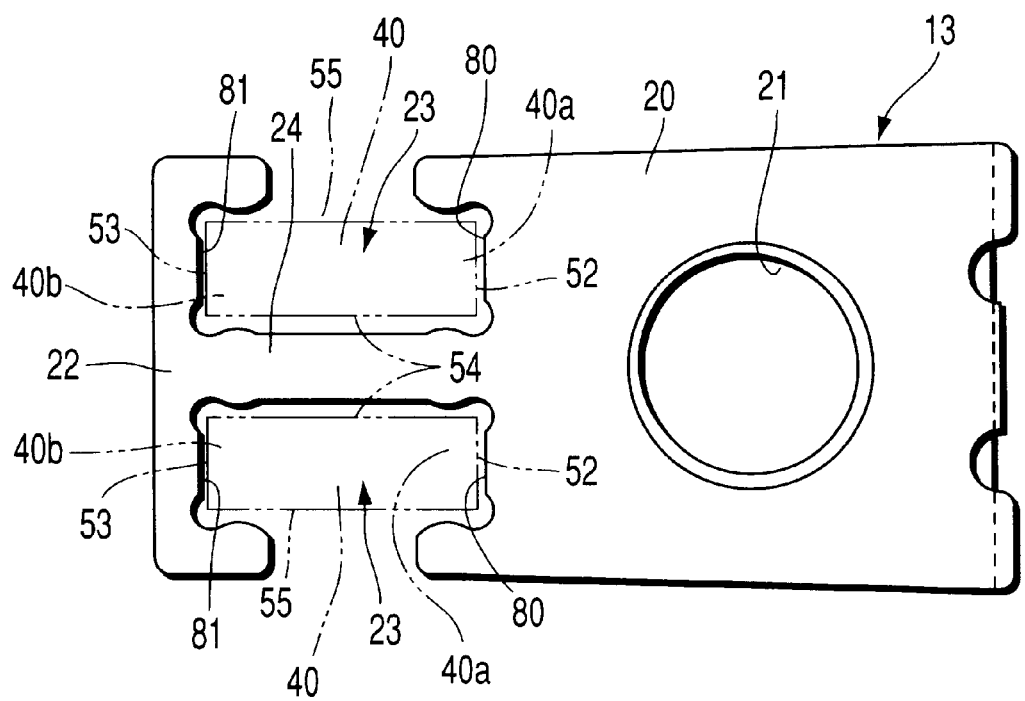
FIG. 2 is a plan view of a base plate of the suspension shown in FIG. 1.

As shown in FIG. 2, a circular boss hole 21 is formed in a proximal portion 20 of the base plate 13. A pair of opening portions 23 are formed between the proximal portion 20 and a front end portion 22 of the base plate 13. Each opening portion 23 is large enough to hold a piezoelectric ceramic element 40. A strip-shaped connecting portion 24 extends in the longitudinal direction of the base plate 13 (axial direction of the suspension 10) between the paired opening portions 23. The connecting portion 24 can bend to a certain degree in the transverse direction of the base plate 13 (sway direction indicated by arrow S in FIG. 1).

The proximal portion 20 of the base plate 13 is fixed to the distal end portion of an actuator arm that is driven by means of a voice coil motor (not shown), and is turned by means of the voice coil motor. The base plate 13 is formed of a metal plate with a thickness of, e.g., about 200 $\mu$m. In the case of this embodiment, the base plate 13 and the hinge member 14 constitute an actuator base 25 according to the present invention.

Figure 3:
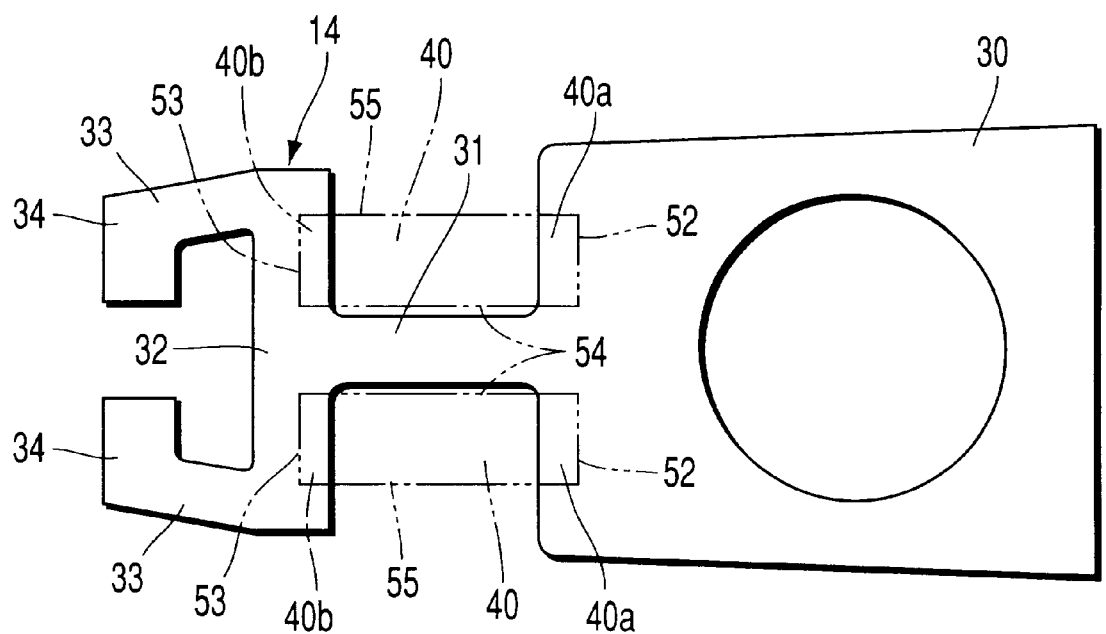
FIG. 3 is a plan view of a plan view of a hinge member of the suspension shown in FIG. 1.

As shown in FIG. 3, the hinge member 14 includes a proximal portion 30 fixedly superposed on the proximal portion 20 of the base plate 13, a stripe-shaped bridge portion 31 formed corresponding in position to the connecting portion 24 of the base plate 13, an intermediate portion 32 formed corresponding in position to the front end portion 22 of the base plate 13, a pair of flexible hinge portions 33 capable of elastic deformation in the thickness direction, a distal end portion 34 fixed to the load beam 11, etc. The hinge member 14 is formed of a springy metal plate with a thickness of, e.g., about 40 $\mu$m.

The micro-actuator portion 12 includes a pair of piezoelectric ceramic elements 40, platelike piezoelectric elements such as PZTS. Each piezoelectric ceramic element 40, in the form of a rectangular plate, has obverse and reverse sides 50 and 51 (shown in FIG. 4) in the thickness direction, end faces 52 and 53 at the opposite ends in the longitudinal direction, and opposite side faces 54 and 55.

Figure 4:
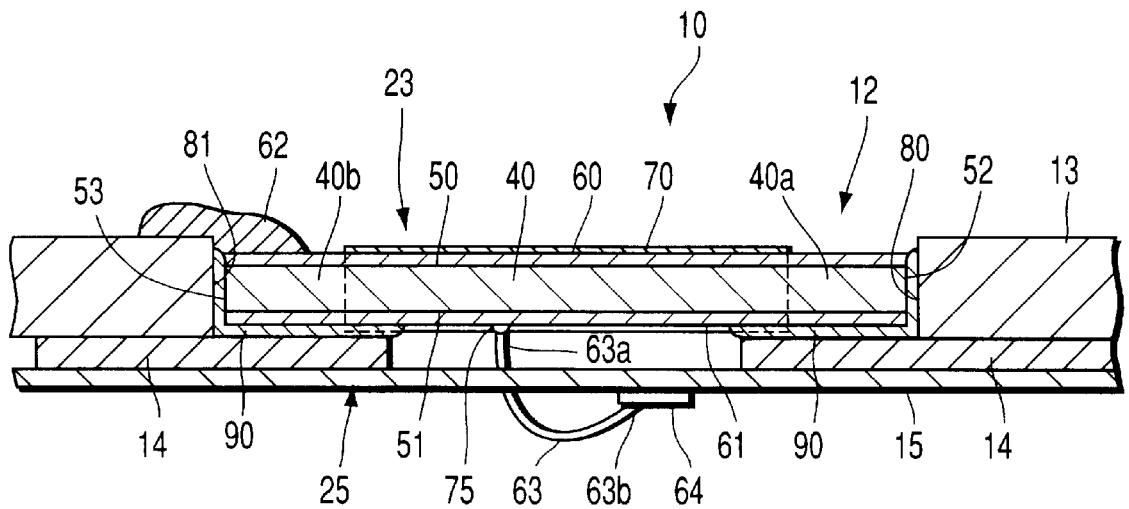
FIG. 4 is a sectional view of the suspension taken along line F4—F4 of FIG. 1.

As shown in FIG. 4 and other drawings, electrodes 60 and 61 of a conductive material such as metal are formed on the obverse and reverse sides 50 and 51, respectively, of each piezoelectric ceramic element 40 by sputtering or plating. The one electrode 60 is grounded on the base plate 13 with silver paste 62. One end 63a of a conductive member 63, such as a wire, is bonded to the other electrode 61. The other end 63b of the conductive member 63 is connected to a terminal 64 of a wiring member on the flexure 15. The end faces 52 and 53 and the side faces 54 and 55 of the piezoelectric ceramic element 40 are cut surfaces that are cut by means of a dicing machine or the like during the manufacture of the element 40.

Figure 5:
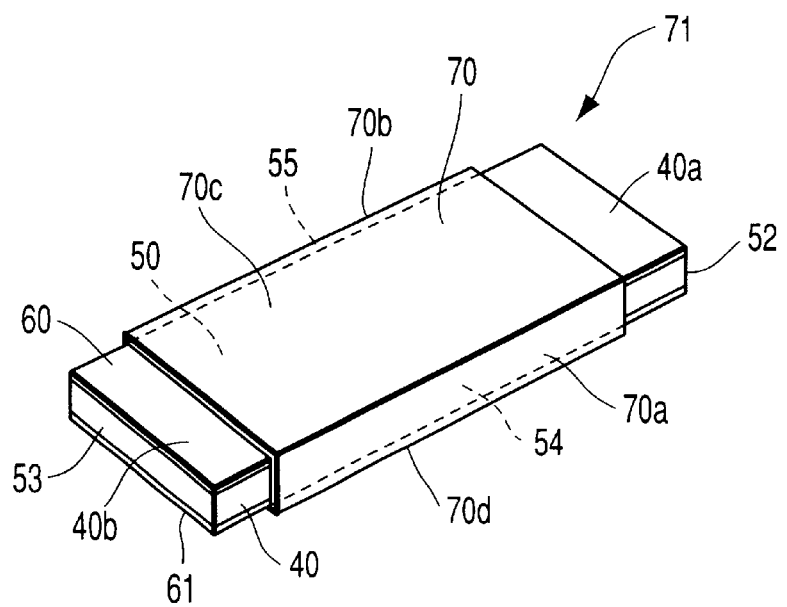
FIG. 5 is a perspective view of a filmed piezoelectric member used in the suspension shown in FIG. 1.
Figures 6, 7:
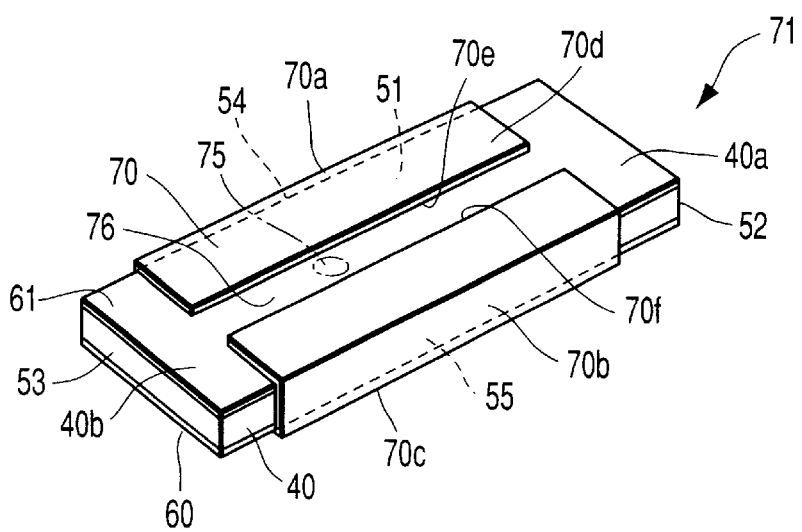
FIG. 6 is a perspective view of the filmed piezoelectric member of FIG. 5 taken from the reverse side.
FIG. 7 is a diagram showing the relationship between voltage applied to the filmed piezoelectric member of FIG. 5 and displacement of the piezoelectric member.

As shown in FIGS. 5 and 6, a cover film 70 is wound around each piezoelectric ceramic element 40. The cover film 70, which is formed of an electrical insulating material, is attached to the element 40 so as to cover the opposite side faces 54 and 55 of the element 40. The cover film 70 may be formed of an adhesive-coated resin tape of any suitable material that includes a plastic tape of, e.g., PET (polyethylene terephthalate) or polyvinyl chloride as a base material and an adhesive agent applied to one surface of the base material. With use of the adhesive agent on the cover film 70, the film 70 with a given thickness can be easily fixed to the element 40. In this specification, each piezoelectric ceramic element 40 having the cover film 70 wound thereon is referred to as a filmed piezoelectric member 71.

Possibly, each piezoelectric ceramic element 40 may be coated with an adhesive agent. If the adhesive agent is used, however, contraction that is caused in the process of its curing may arouse a problem, in some cases. If the cover film 70 is formed by attaching the resin tape, as in the case of this embodiment, however, the problem of contraction that is attributable to the curing of the adhesive agent can be avoided.

According to this embodiment, the cover film 70 includes portions 70a and 70b that covers the opposite side portions 54 and 55, respectively, of each piezoelectric ceramic element 40, a portion 70c that covers the obverse side 50 of the element 40, extending the element 50 between the side faces 54 and 55, and portions 70d that cover the reverse side 51 of the element 40. On the reverse side 51 of the element 40, as shown in FIG. 6, a slit 76, as an example of a bonding opening, is formed between opposite ends 70e and 70f of the cover film 70, in order to expose a bonding region 75 between the electrode 61 and the conductive member 63 (shown in FIG. 4).

As shown in FIG. 1, the paired piezoelectric ceramic elements 40 are stored individually in the opening portions 23 of the actuator base 25 so as to extend substantially parallel to each other. The opposite end faces 52 and 53 of each element 40 face inner surfaces 80 and 81 at the longitudinally opposite ends of each corresponding opening portion 23, respectively. The side face 54 of each element 40 extends along the connecting portion 24 of the base plate 13.

Each filmed piezoelectric member 71 is stored in each corresponding opening portion 23. One end portion 40a of each piezoelectric ceramic element 40 is fixed to the proximal portion 30 of the hinge member 14 with an electrical insulating adhesive agent 90. The other end portion 40b of the element 40 is fixed to an intermediate portion 32 of the hinge member 14 with the same adhesive agent 90. Thus, the element 40 is fixed to the actuator base 25 with the opposite end faces 52 and 53 of the piezoelectric ceramic element 40 covered with the adhesive agent 90. The adhesive agent 90 may be formed of any of suitable materials including an epoxy resin.

The adhesive agent 90 should be also loaded into the space between the inner surfaces 80 and 81 of each opening portion 23 of the actuator base 25 and the end faces 52 and 53 of each element 40. The adhesive agent 90 also serves more effectively to transmit distortion (displacement) of each piezoelectric ceramic element 40 to the load beam 11 and fully to secure electrical insulation between the actuator base 25 the end faces 52 and 53 and the side faces 54 and 55 of the element 40.

When voltage is applied, one of the piezoelectric ceramic elements 40 extends in the longitudinal direction, while the other element 40 contracts in the longitudinal direction. Thus, the load beam 11 is displaced for a desired distance in the transverse direction (sway direction) in accordance with the direction and stroke of the distortion of the piezoelectric ceramic elements 40.

The inventors hereof conducted a test for examining relations between applied voltages and displacements of two samples to see how the displacement (stroke) of each piezoelectric ceramic element 40 is influenced if the element 40 is wound with the cover film 70. In consequence, displacements of Sample 1 before and after the attachment of the cover film 70 were 1.2 $\mu$m and 1.208 $\mu$m, respectively, which indicate no substantial change. Displacements of Sample 2 before and after the attachment of the cover film 70 were 1.2 $\mu$m and 1.224 $\mu$m, respectively, which indicate no substantial change either. Thus, it was confirmed that neither of Samples 1 and 2 underwent any practically significant deterioration in stroke.

FIG. 7 shows the relationship (hysteresis loop) between the voltage and displacement of Sample 1 (piezoelectric ceramic element with the cover film thereon). As seen from FIG. 7, the hysteresis of Sample 1 was not substantially changed by the attachment of the cover film 70, and the film 70 exerted no bad influence upon the properties of each piezoelectric ceramic element 40.

Since the opposite side faces 54 and 55 of each piezoelectric ceramic element 40 of this embodiment are covered with the cover film 70, side faces 54 and 55 can be prevented from generating particles. Since the opposite end faces 52 and 53 of each element 40 are covered with the adhesive agent 90, moreover, end faces 52 and 53 can be also prevented from generating particles.

Figure 8:
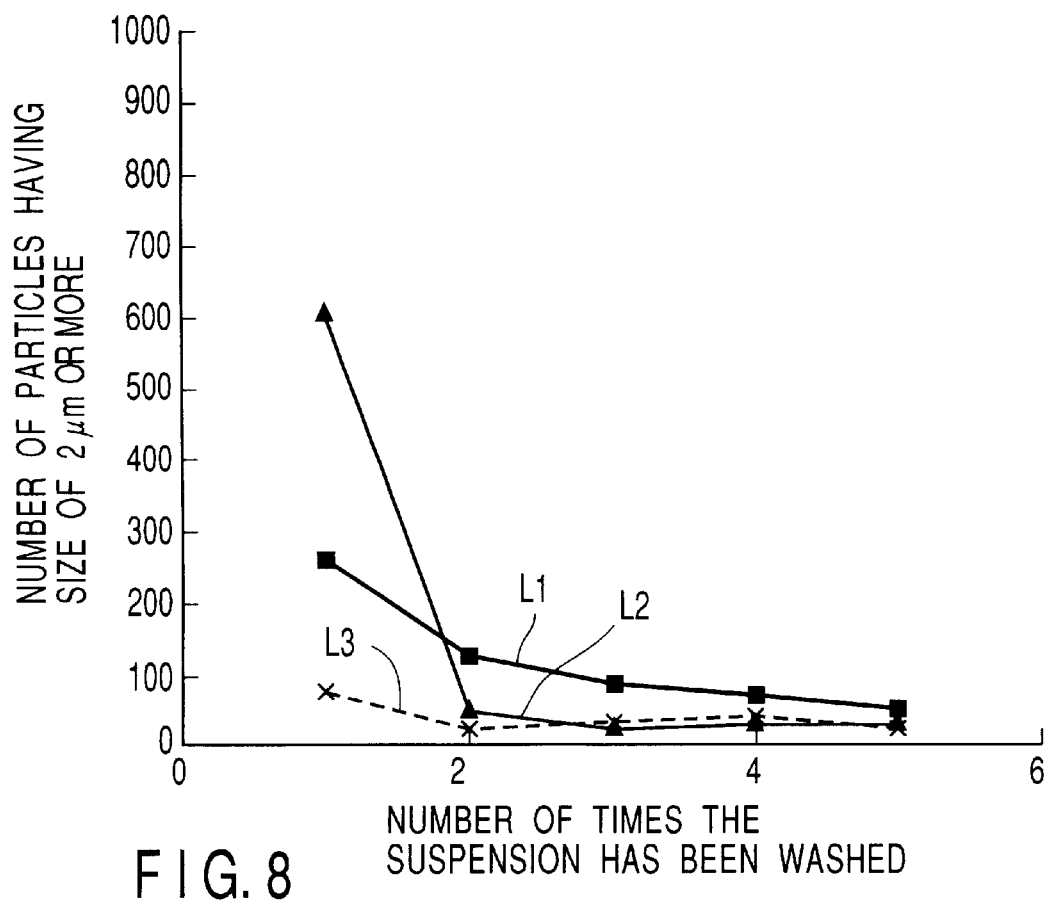
FIG. 8 is a diagram showing changes of the number of particles for cases where the suspension shown in FIG. 1 and a suspension with no piezoelectric ceramic elements are subjected to ultrasonic cleaning.

The suspension 10 provided with the filmed piezoelectric members 71 described above was subjected to ultrasonic cleaning and to a test for counting particles in a liquid. FIG. 8 shows the result of the test. In FIG. 8, a measured value L1 represents the number of particles of the suspension that is provided with the piezoelectric ceramic elements with no cover films. In FIG. 8, a measured value L2 represents the number of particles of the suspension 10 of the foregoing embodiment having the piezoelectric ceramic elements 40 covered with the cover films 70. L3 represents the number of particles of the conventional suspension that is not provided with any piezoelectric ceramic elements.

When the suspension 10 of the foregoing embodiment was washed twice, the number of particles was reduced to the same level reached when the suspension with no piezoelectric ceramic elements (measured value L3) was washed twice, as indicated by L2 in FIG. 8. Thus, it was confirmed that the suspension 10 of the foregoing embodiment was able to avoid generating particles from the piezoelectric ceramic elements.

Figure 9:
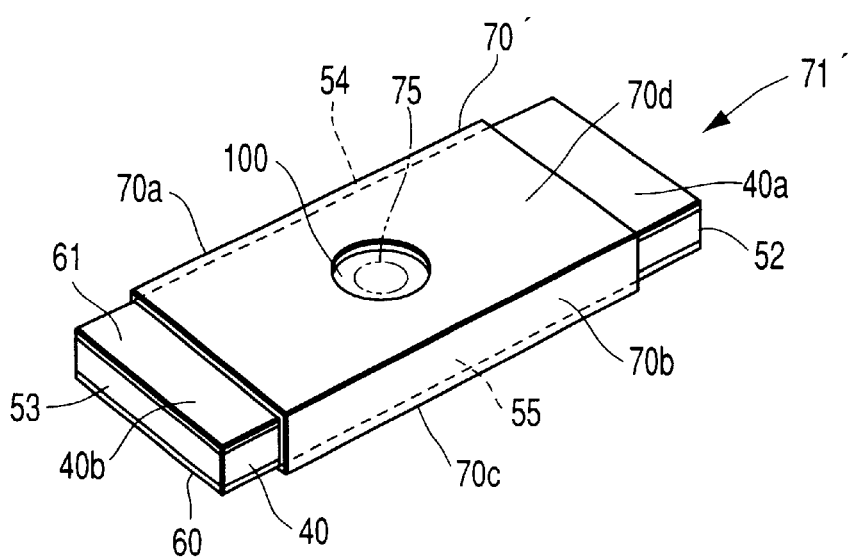
FIG. 9 is a plan view of a filmed piezoelectric member according to a second embodiment of the invention.

FIG. 9 shows a filmed piezoelectric member 71' according to a second embodiment of the invention. A piezoelectric ceramic element 40 of the piezoelectric member 71' is also wound with a cover film 70' that is formed of the same material used in the first embodiment. The cover film 70' is formed having a hole 100 as an example of the bonding opening through which the bonding region 75 of the conductive member 63 (shown in FIG. 4) on the electrode 61 is exposed. The second embodiment shares other configurations and functions with the suspension 10 of the first embodiment. Therefore, common reference numerals are used to designate common portions of the two embodiments, and a description of those portions is omitted. The cover film may be divided in a plurality of portions that can cover only the opposite side faces 54 and 55 of the piezoelectric ceramic element 40 or be designed to cover the whole outer periphery of the element 40.

In the case of the suspension 10 of the foregoing embodiment, the piezoelectric ceramic elements 40 are held in the opening portions 23 in the actuator base 25. Instead of holding the elements 40 in the opening portions 23, however, the elements 40 may be fixedly superposed on the actuator base 25.

It is to be understood, in carrying out the present invention including the embodiments described herein, that the components that constitute the invention, including the respective materials or configurations of the load beam, base plate, hinge member, actuator base, piezoelectric ceramic elements, cover films, etc., may be variously changed or modified without departing from the scope or spirit of the invention. For lighter weight, the base plate and the load beam may be formed of a light metal alloy, such as aluminum alloy, or a laminate (e.g., cladding) of a light metal alloy and stainless steel.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for a disc drive, comprising:
   a load beam provided with a flexure;
   an actuator base provided on a proximal portion of the load beam;
   a plate-like piezoelectric ceramic element, lying in a plane, mounted on the actuator base and adapted to be distorted to displace the load beam when voltage is applied thereto; and
   a cover film formed of an electrical insulating material and attached to at least side faces, including cut surfaces, of the piezoelectric ceramic element so as to cover the side faces, thereby preventing generation of particles from the side faces, the cut surfaces being substantially non-parallel to the plane of the plate-like piezoelectric ceramic element.

2. A suspension for disc drive according to claim 1, wherein said actuator base is formed having an opening portion capable of holding the piezoelectric ceramic element, the opening portion holding the piezoelectric ceramic element with the cover film thereon.

3. A suspension for disc drive according to claim 2, wherein said load beam and said actuator base are connected to each other by means of a flexible hinge member.

4. A suspension for disc drive according to claim 3, wherein said cover film is formed of a plastic tape with an adhesive agent thereon.

5. A suspension for disc drive according to claim 3, wherein said cover film includes portions covering the opposite side faces of the piezoelectric ceramic element, a portion extending between the opposite side faces, and a bonding opening for exposing a bonding region between an electrode of the ceramic element and an external conductive member.

6. A suspension for disc drive according to claim 3, wherein said piezoelectric ceramic element is bonded to the actuator base with the opposite end faces of the piezoelectric ceramic element covered with an electrical insulating adhesive agent.

7. A suspension for disc drive according to claim 2, wherein said cover film is formed of a plastic tape with an adhesive agent thereon.

8. A suspension for disc drive according to claim 2, wherein said cover film includes portions covering the opposite side faces of the piezoelectric ceramic element, a portion extending between the opposite side faces, and a bonding opening for exposing a bonding region between an electrode of the ceramic element and an external conductive member.

9. A suspension for disc drive according to claim 2, wherein said piezoelectric ceramic element is bonded to the actuator base with the opposite end faces of the piezoelectric ceramic element covered with an electrical insulating adhesive agent.

10. A suspension for disc drive according to claim 1, wherein said load beam and said actuator base are connected to each other by means of a flexible hinge member.

11. A suspension for disc drive according to claim 10, wherein said cover film is formed of a plastic tape with an adhesive agent thereon.

12. A suspension for disc drive according to claim 10, wherein said cover film includes portions covering the opposite side faces of the piezoelectric ceramic element, a portion extending between the opposite side faces, and a bonding opening for exposing a bonding region between an electrode of the ceramic element and an external conductive member.

13. A suspension for disc drive according to claim 10, wherein said piezoelectric ceramic element is bonded to the actuator base with the opposite end faces of the piezoelectric ceramic element covered with an electrical insulating adhesive agent.

14. A suspension for disc drive according to claim 1, wherein said cover film is formed of a plastic tape with an adhesive agent thereon.

15. A suspension for disc drive according to claim 1, wherein said cover film includes portions covering the opposite side faces of the piezoelectric ceramic element, a portion extending between the opposite side faces, and a bonding opening for exposing a bonding region between an electrode of the ceramic element and an external conductive member.

16. A suspension for disc drive according to claim 1, wherein said piezoelectric ceramic element is bonded to the actuator base with the opposite end faces of the piezoelectric ceramic element covered with an electrical insulating adhesive agent.

* * * * *